(12) United States Patent
Elliot et al.

(10) Patent No.: US 9,131,040 B2
(45) Date of Patent: Sep. 8, 2015

(54) ALARM SYSTEM FOR USE OVER SATELLITE BROADBAND

(75) Inventors: Harvey Alexander Elliot, Ojai, CA (US); Bryan Field-Elliot, Ojai, CA (US); Daniel J. Elliot, Ojai, CA (US)

(73) Assignee: NUMEREX CORP., Atlanta, GA (US)

( * ) Notice: Subject to any disclaimer, the term of this patent is extended or adjusted under 35 U.S.C. 154(b) by 1526 days.

(21) Appl. No.: 12/504,709

(22) Filed: Jul. 17, 2009

(65) Prior Publication Data
US 2010/0277271 A1    Nov. 4, 2010

Related U.S. Application Data

(63) Continuation-in-part of application No. 11/517,025, filed on Sep. 7, 2006, now Pat. No. 7,613,278, which is a continuation-in-part of application No. 11/226,857, filed on Sep. 14, 2005, now Pat. No. 7,593,512, and a (Continued)

(51) Int. Cl.
| H04M 11/04 | (2006.01) |
| H04M 3/08 | (2006.01) |
| H04M 3/22 | (2006.01) |
| H04M 7/00 | (2006.01) |

(52) U.S. Cl.
CPC ............ *H04M 3/08* (2013.01); *H04M 3/2227* (2013.01); *H04M 7/0084* (2013.01); *H04M 11/045* (2013.01); *H04M 2242/04* (2013.01)

(58) Field of Classification Search
CPC . H04M 17/023; H04M 11/04; H04M 11/045; H04M 2242/04; H04W 76/007; H04W 4/22; G01F 15/075; G08B 25/14; G01R 31/3662; B60R 16/0315

USPC ............ 379/36–51; 455/404, 404.1; 340/870.06, 506, 6.1, 6.11, 3.42
See application file for complete search history.

(56) References Cited

U.S. PATENT DOCUMENTS

| 4,465,904 A | 8/1984 | Gottsegen et al. |
| 4,692,742 A | 9/1987 | Raizen et al. |

(Continued)

OTHER PUBLICATIONS

Barneet Engineering Ltd., Alarm Reporting Unit Operating Manual, Jul. 2003.*

(Continued)

*Primary Examiner* — Akelaw Teshale
(74) *Attorney, Agent, or Firm* — King & Spalding LLP

(57) ABSTRACT

The present invention allows an alarm monitoring to use satellite broadband services as a data link for communication between an alarms system and a monitoring station, middleware provider, individual user, or other alarm monitor. Standard alarm system protocols are modified to make the communication protocol compatible with the features of satellite broadband. These modifications compensate for the time delay in data transmission inherent in satellite communications, as well as other limitations of satellite communications. In particular, the "handshake" tone, instead of "1400 hz for 100 ms, silence for 100 ms, 2300 hz for 100 ms", is changed to "DTMF 'A' for at least 100 milliseconds". In a preferred embodiment the receiver transmits the DTMF A tone for 250 milliseconds. In addition, the delay for "wait for the Acknowledge tone" is extended from 1.25 seconds, to 5 seconds. The "acknowledge" tone, instead of "1400 hz for 400 ms", is changed to "DTMF 'D' for at least 100 milliseconds". In a preferred embodiment, the receiver transmits the DTMF D tone for 250 milliseconds.

24 Claims, 4 Drawing Sheets

Related U.S. Application Data continuation-in-part of application No. 10/861,790, filed on Jun. 7, 2004, now Pat. No. 7,440,554, which is a continuation-in-part of application No. 10/840,280, filed on May 7, 2004, now abandoned, which is a continuation-in-part of application No. 10/462,708, filed on Jun. 17, 2003, now Pat. No. 7,245,703, and a continuation-in-part of application No. 11/348,291, filed on Feb. 6, 2006, now Pat. No. 7,734,020, and a continuation-in-part of application No. 12/018,724, filed on Jan. 23, 2008.

(60) Provisional application No. 61/081,431, filed on Jul. 17, 2008, provisional application No. 60/651,662, filed on Feb. 11, 2005, provisional application No. 60/389,960, filed on Jun. 20, 2002.

(56) References Cited

U.S. PATENT DOCUMENTS

| | | | |
|---|---|---|---|
| 4,918,717 | A | 4/1990 | Bissonnette et al. |
| 5,134,644 | A | 7/1992 | Garton et al. ............ 379/39 |
| 5,195,126 | A | 3/1993 | Carrier et al. |
| 5,365,568 | A | 11/1994 | Gilbert ............ 379/43 |
| 5,400,011 | A | 3/1995 | Sutton |
| 5,463,595 | A | 10/1995 | Rodhall |
| 5,568,475 | A | 10/1996 | Doshi et al. |
| 5,736,927 | A | 4/1998 | Stebbins et al. |
| 5,796,633 | A | 8/1998 | Burgess et al. ............ 702/187 |
| 5,808,547 | A | 9/1998 | Carney |
| 5,838,223 | A | 11/1998 | Gallant et al. |
| 5,877,684 | A | 3/1999 | Lu |
| 5,923,731 | A | 7/1999 | McClure ............ 379/33 |
| 5,940,474 | A | 8/1999 | Ruus |
| 6,075,451 | A | 6/2000 | Lebowitz et al. ........ 340/539.19 |
| 6,215,404 | B1 | 4/2001 | Morales |
| 6,243,373 | B1 | 6/2001 | Turock |
| 6,272,212 | B1 | 8/2001 | Wulforst et al. ............ 379/199 |
| 6,288,642 | B1 | 9/2001 | Dohnmann |
| 6,311,072 | B1 | 10/2001 | Barclay et al. ............ 455/552 |
| 6,369,705 | B1 | 4/2002 | Kennedy |
| 6,381,307 | B1 | 4/2002 | Jeffers et al. ............ 379/142.01 |
| 6,400,265 | B1 | 6/2002 | Saylor et al. |
| 6,438,124 | B1 | 8/2002 | Wilkes et al. |
| 6,452,490 | B1 | 9/2002 | Garland et al. ............ 340/506 |
| 6,493,435 | B1 | 12/2002 | Petricoin ............ 379/93.05 |
| 6,553,100 | B1 | 4/2003 | Chen et al. |
| 6,574,480 | B1 | 6/2003 | Foladare et al. |
| 6,577,234 | B1 | 6/2003 | Dohrmann |
| 6,603,845 | B2 | 8/2003 | Jensen et al. ............ 379/142.01 |
| 6,661,340 | B1 | 12/2003 | Saylor et al. |
| 6,683,526 | B2 | 1/2004 | Bellin |
| 6,829,478 | B1 | 12/2004 | Layton et al. ............ 455/428 |
| 6,831,557 | B1 | 12/2004 | Hess |
| 6,870,906 | B2 | 3/2005 | Dawson |
| 6,928,148 | B2 | 8/2005 | Simon et al. |
| 6,965,313 | B1 | 11/2005 | Saylor et al. |
| 6,973,165 | B2 | 12/2005 | Giacopelli et al. |
| 7,002,462 | B2 | 2/2006 | Welch |
| 7,009,519 | B2 | 3/2006 | Leonard |
| 7,103,152 | B2 | 9/2006 | Naidoo et al. |
| 7,113,090 | B1 | 9/2006 | Saylor et al. |
| 7,119,609 | B2 | 10/2006 | Naidoo et al. |
| 7,245,703 | B2 | 7/2007 | Elliot et al. |
| 7,262,690 | B2 | 8/2007 | Heaton et al. |
| 7,406,710 | B1 | 7/2008 | Zellner et al. |
| 7,429,921 | B2 | 9/2008 | Seeley et al. |
| 7,440,554 | B2 | 10/2008 | Elliot et al. |
| 7,542,721 | B1 | 6/2009 | Bonner et al. |
| 7,558,379 | B2 | 7/2009 | Winick |
| 7,593,512 | B2 | 9/2009 | Elliot et al. |
| 7,593,513 | B2 | 9/2009 | Muller |
| 7,613,278 | B2 | 11/2009 | Elliot et al. |
| 7,619,512 | B2 | 11/2009 | Trundle |
| 7,633,385 | B2 | 12/2009 | Cohn et al. |
| 7,653,186 | B2 | 1/2010 | Hosain et al. |
| 7,751,540 | B2 | 7/2010 | Whitfield et al. |
| 7,778,394 | B2 | 8/2010 | Small et al. |
| 7,820,841 | B2 | 10/2010 | Martin et al. |
| 7,848,505 | B2 | 12/2010 | Martin et al. |
| 7,853,200 | B2 | 12/2010 | Blum et al. |
| 7,855,635 | B2 | 12/2010 | Cohn et al. |
| 7,911,341 | B2 | 3/2011 | Raji et al. |
| 7,920,841 | B2 | 4/2011 | Martin et al. |
| 7,920,842 | B2 | 4/2011 | Martin et al. |
| 7,920,843 | B2 | 4/2011 | Martin et al. |
| 7,961,088 | B2 | 6/2011 | Watts et al. |
| 8,022,807 | B2 | 9/2011 | Martin et al. |
| 8,073,931 | B2 | 12/2011 | Dawes et al. |
| 8,116,724 | B2 | 2/2012 | Peabody |
| 8,214,494 | B1 | 7/2012 | Slavin |
| 8,335,842 | B2 | 12/2012 | Raji et al. |
| 8,350,694 | B1 | 1/2013 | Trundle et al. |
| 8,456,293 | B1 | 6/2013 | Trundle et al. |
| 8,473,619 | B2 | 6/2013 | Baum et al. |
| 8,478,844 | B2 | 7/2013 | Baum et al. |
| 8,493,202 | B1 | 7/2013 | Trundle et al. |
| 8,520,072 | B1 | 8/2013 | Slavin et al. |
| 8,525,665 | B1 | 9/2013 | Trundle et al. |
| 2002/0103898 | A1 | 8/2002 | Moyer |
| 2002/0128115 | A1 | 9/2002 | Giacopelli et al. ............ 340/506 |
| 2002/0147982 | A1 | 10/2002 | Naidoo |
| 2002/0176581 | A1 | 11/2002 | Bilgic |
| 2002/0177428 | A1 | 11/2002 | Menard et al. |
| 2003/0027547 | A1 | 2/2003 | Wade |
| 2003/0071724 | A1 | 4/2003 | D'Amico |
| 2004/0005044 | A1 | 1/2004 | Yeh |
| 2004/0086088 | A1 | 5/2004 | Naidoo |
| 2004/0086093 | A1 | 5/2004 | Schranz |
| 2005/0099893 | A1 | 5/2005 | Jyrinki |
| 2005/0285723 | A1* | 12/2005 | Chen et al. ............ 340/426.15 |
| 2006/0023848 | A1 | 2/2006 | Mohler et al. |
| 2006/0176167 | A1* | 8/2006 | Dohrmann ............ 340/506 |
| 2006/0239250 | A1 | 10/2006 | Elliot |
| 2007/0115930 | A1 | 5/2007 | Reynolds et al. |
| 2007/0143838 | A1 | 6/2007 | Milligan |
| 2007/0155412 | A1 | 7/2007 | Kalsukis |
| 2008/0084291 | A1 | 4/2008 | Campion, Jr. |
| 2008/0117029 | A1 | 5/2008 | Dohrmann |
| 2008/0191863 | A1* | 8/2008 | Boling et al. ............ 340/521 |
| 2008/0311879 | A1* | 12/2008 | Martin et al. ............ 455/404.1 |
| 2009/0017757 | A1 | 1/2009 | Koga |
| 2009/0213999 | A1 | 8/2009 | Farrand |
| 2009/0248967 | A1 | 10/2009 | Sharma |
| 2009/0264155 | A1 | 10/2009 | Nakayama et al. |
| 2009/0274104 | A1 | 11/2009 | Addy |
| 2010/0007488 | A1 | 1/2010 | Sharma et al. |
| 2010/0052890 | A1 | 3/2010 | Trundle |
| 2010/0121948 | A1 | 5/2010 | Procopio |
| 2010/0289643 | A1 | 11/2010 | Trundle |
| 2010/0289644 | A1 | 11/2010 | Slavin |
| 2011/0031907 | A1 | 2/2011 | Beppler et al. |
| 2011/0065414 | A1 | 3/2011 | Frenette |
| 2011/0169628 | A1 | 7/2011 | Elliot |
| 2012/0027010 | A1 | 2/2012 | Elliot et al. |
| 2012/0139718 | A1 | 6/2012 | Foisy et al. |
| 2012/0250833 | A1 | 10/2012 | Smith et al. |
| 2012/0250834 | A1 | 10/2012 | Smith |
| 2012/0275588 | A1 | 11/2012 | Gregory |
| 2013/0189946 | A1 | 7/2013 | Swanson |
| 2013/0194091 | A1 | 8/2013 | Trundle |
| 2013/0215266 | A1 | 8/2013 | Trundle |
| 2013/0234840 | A1 | 9/2013 | Trundle |

OTHER PUBLICATIONS

U.S. Appl. No. 13/939,460, Harvey Elliot et al.
U.S. Appl. No. 14/039,573, Michael Gregory.
U.S. Appl. No. 14/039,821, Michael Gregory.
U.S. Appl. No. 14/050,655, Harvey Elliot et al.

* cited by examiner

ALARM SYSTEM FOR USE OVER SATELLITE BROADBAND

CROSS-REFERENCE TO RELATED APPLICATIONS

The present application is a Non-Provisional of Provisional U.S. patent application Ser. No. 61,081,431, filed on Jul. 17, 2008 and incorporated herein by reference; The present application is also a Continuation-In-Part of U.S. patent application Ser. No. 11/517,025, filed on Sep. 7, 2006, and incorporated herein by reference; which in turn is a Continuation-In-Part of U.S. patent application Ser. No. 11/226,857 filed on Sep. 14, 2005 and incorporated herein by reference; application Ser. No. 11/226,857 in turn claims priority from Provisional U.S. Patent Application Ser. No. 60/651,662 filed on Feb. 11, 2005 and incorporated herein by reference; application Ser. No. 11/226,857 is also a Continuation-In-Part (CIP) of co-pending application Ser. No. 10/861,790, filed on Jun. 7, 2004, and incorporated herein by reference; application Ser. No. 11/226,857 is in turn a Continuation-In-Part of U.S. patent application Ser. No. 10/840,280 filed on May 7, 2004, and incorporated herein by reference, which in turn is Continuation-In-Part of U.S. patent application Ser. No. 10/462,708 filed on Jun. 17, 2003, (now U.S. Pat. No. 7,245,705) and incorporated herein by reference, which in turn claims priority from Provisional U.S. Patent Application Ser. No. 60/389,960, also incorporated herein by reference; The present application is also a Continuation-In-Part (CIP) of co-pending U.S. patent application Ser. No. 11/348,291 filed on Feb. 2, 2006 and incorporated herein by reference; The present application is also a Continuation-In-Part of U.S. patent application Ser. No. 12/018,724 filed on Jan. 23, 2008, and incorporated herein by reference.

FIELD OF THE INVENTION

The present invention relates to an alarm system for use over satellite broadband connections. In particular, the present invention is directed toward a technique for modifying alarm system protocols to compensate for inherent features of the satellite broadband link.

BACKGROUND OF THE INVENTION

Traditional alarm systems have been of the "dialup" variety. When an alarm (or other) condition occurs in the home or business, the alarm panel dials up a remote monitoring station or middleware provider or other monitor, based on a pre-programmed phone number stored in the alarm system memory. Once the connection is made, the alarm or other condition is transmitted to the monitor using DTMF (Dual Tone, Multiple Frequency) signals to indicate the source of the alarm or other signal and the type of alarm or other signal. The alarm or other signal may include burglary, fire, water intrusion, glass break, alarm set and reset, maintenance, and other signals generated by the alarm system located on the premises.

The dialup systems suffer from a number of faults, not the least of which is the problem that the system "seizes" the phone line when an alarm condition occurs, and as a result, prevents the alarm user from calling in a false alarm or the like. In addition, these prior art "dialup" alarm systems are programmed to work with a POTS (Plain Old Telephone Service) line, and not any of the new types of phone services, such as VoIP, Vonage, Skype, cellular, and the like. A further fault is that the systems are generally programmed to dial out to a number programmed into the system, making it difficult for the consumer to change monitoring providers and the like.

Methods and apparatus have been developed for modifying such alarm systems to work with other monitoring providers, middleware providers, and the like, and reference is made to applicant's prior applications previously incorporated by reference. In addition, methods and apparatus for using broadband communications to monitor alarm systems, either through VoIP broadband links or by interfacing the alarm system directly to a broadband connection, are also disclosed in the aforementioned applications previously incorporated by reference.

In many areas, however, broadband is not available, either as DSL (Digital Subscriber Line) or by Cable Modem or other means (e.g., wireless broadband, cellular modem, and the like). Thus, high-speed Internet users may have to resort to a satellite link to obtain a broadband Internet connection. DirectWay, now HughesNet, is probably the best known of these satellite service providers. While satellite broadband provides a service almost equivalent to DSL or Cable Modem broadband, in terms of speed, there are some inherent differences in the technologies which make satellite broadband different.

Since satellite broadband relies on the use of a geo-synchronous and geo-stable satellite, in fixed orbit about 22,233 miles from the surface of the earth, there is a time delay between when a signal is sent from an uplink at either end, and when it is received by the downlink at the other end. At the speed of light, this delay would amount to about 0.2 seconds, round trip, although other links in the Internet add additional delays as well. Thus, some broadband applications may not work or work well with satellite broadband communications. For example, when testing the Vonage® broadband VoIP communications system over a HughesNet satellite link, it was noted that while the system could be made to work for brief periods, there were time delays on the order of a second or more.

Moreover, as satellite broadband is an asymmetrical data link (like most DSL), the uplink data path from the consumer is much smaller (on the order of 56K dialup) than the downlink (on the order of DSL) from the service provider. In addition, atmospheric conditions (clouds, rain, and the like) can severely limit or cut off satellite broadband communications entirely. Again, when attempting to text a Vonage® box on a Hughesnet connection, it was possible to connect brief calls. However since the uplink bandwidth is so narrow, the signal from the subscriber was garbled and incoherent, while the return path signal was at least understandable.

Prior Art alarm systems are generally designed using one or more an industry standard protocols. Ademco® is one of the largest maker of alarm systems, and uses a common set of alarm protocols for most of its alarm systems. One of these is the Ademco® Contact ID Protocol, described in the document *Digital Communication Standard—Ademco® Contact ID Protocol for Alarm system Communication*" SIA DC-04-1999.09, Security Industry Association, © 19999, Publication Order Number 140-85, incorporated herein by reference. Many other alarm makers use similar or identical protocols or offer compatibility with the Ademco® Contact ID protocol.

FIG. 2 is a block diagram illustrating the main steps in the operation of the Contact ID Protocol. Once an alarm or other condition occurs in step 200, the alarm system dials out to a pre-programmed phone number. Once the call is completed and the alarm monitor "picks up" a handshake is generated an detected in step 210 comprising a tone of 1400 hz for 100 ms, then silence for 100 ms, and then a tone of 2300 hz for 100 ms. The alarm system then waits for an acknowledge tone for a period of about 1.25 seconds. This acknowledge tone may comprise a 1400 hz tone generated for 400 ms. Once the handshake and acknowledge tone are exchanged, the system waits until the end of the tones in step 220. After a delay of 250 milliseconds in step 230, the alarm system and monitor may communicate via DTMF tones, for example, a 4 digits account code, a 2 digit alarm code, and then a checksum code or the like in steps 240 and 250.

Each message is searched for the presence of the "kiss-off" tone in step 260 to determine whether the communication is complete. If the kiss-off tone is detected in step 270, a determination is made in step 280 whether more messages are to be exchanged. If yes, processing returns to step 220. If not, processing proceeds to step 290, the phone connection is broken and the process ends in step 300. If no kiss-off is received in step 270, and the increment attempt count is greater than four, as determined in step 275, the call is ended. If not, processing returns to step 250 and a message transmission is attempted again.

Transmission of DTMF alarm codes themselves may not present much of a problem using VoIP connections on satellite broadband. However, due to the time delays mentioned above, the handshake and acknowledge codes may not function properly, as the time period for the acknowledge tone may "time out" before the tone is received. Thus, broadband applications such as alarm systems over VoIP or alarm systems using direct broadband connections may not operate properly when used over a satellite broadband communications link.

SUMMARY OF THE INVENTION

The present invention allows an alarm monitoring to use satellite broadband services as a data link for communication between an alarms system and a monitoring station, middleware provider, individual user, or other alarm monitor. Standard alarm system protocols are modified to make the communication protocol compatible with the features of satellite broadband. These modifications compensate for the time delay in data transmission inherent in satellite communications, as well as other limitations of satellite communications.

Timeout periods for the communication protocol are modified to suit the particular communication path (satellite, DSL, cable modem, or the like). These timeout periods may be selected dynamically by monitoring the data path for inherent latency, or may be selected via programming or the like. For dynamic monitoring, the data path may be monitored initially or periodically to determine the inherent latency of the system, and using this information, the system may select the optimal timeout periods for data communications. In a programmed mode, the user or operator may select the data path used (cable modem, DSL, satellite) and from this information, the system may select the correct timeout periods for the selected data path.

In one particular embodiment, for use with satellite communications, the "handshake" tone, instead of "1400 hz for 100 ms, silence for 100 ms, 2300 hz for 100 ms", is changed to "DTMF 'A' for at least 100 milliseconds". In a preferred embodiment the receiver transmits the DTMF A tone for 250 milliseconds. In addition, the delay for "wait for the Acknowledge tone" is extended from 1.25 seconds, to 5 seconds. The "acknowledge" tone, instead of "1400 hz for 400 ms", is changed to "DTMF 'D' for at least 100 milliseconds". In a preferred embodiment, the receiver transmits the DTMF D tone for 250 milliseconds.

DETAILED DESCRIPTION OF THE INVENTION

Figure 1:
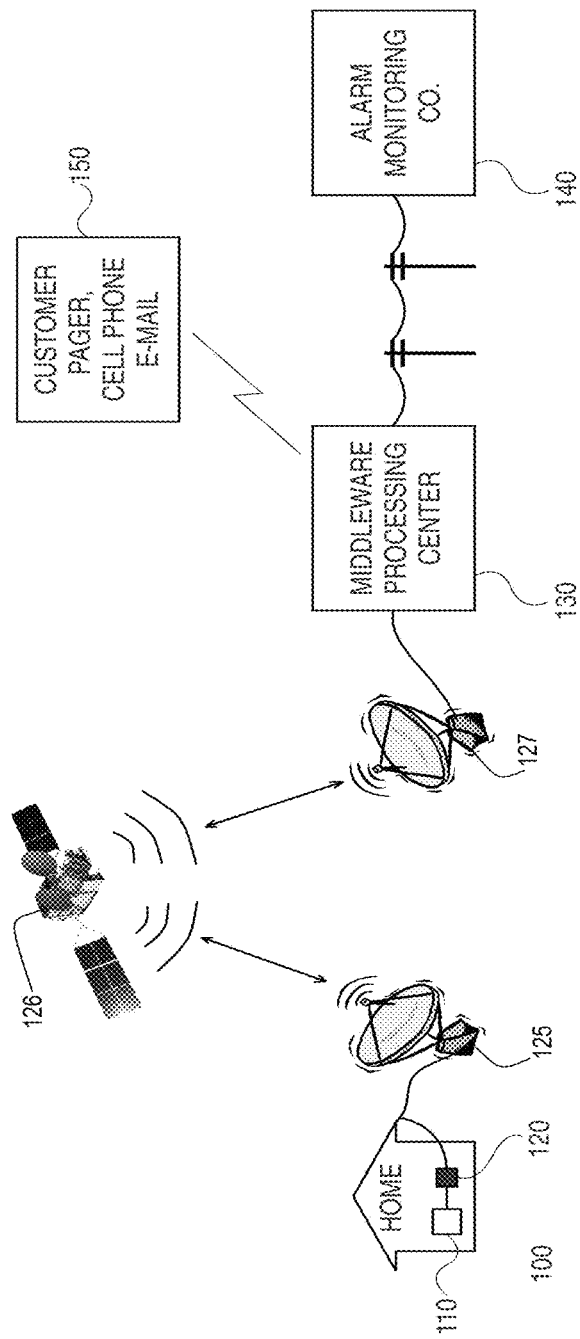
FIG. 1 is a block diagram of the present invention.

Referring now to FIG. 1, a home 100 is illustrated provided with an alarm system 110. For the purposes of illustration, home 100 is illustrated as a residence. However, home 100 may represent any alarmed structure or device, including but not limited to, businesses, factories, stores, and the like, as well as boats, cars, airplanes, and the like.

Alarm system 110 may comprise any one of a number of known alarm systems used in the art or contemplated in the future. Examples of such alarm systems include, but are not limited to, the wired and wireless systems offered by ADEMCO (Honeywell), Louisville, Ky. or user-installed systems such as those sold by LASERSHIELD of Los Cruces, N. Mex. Such alarm systems are characterized in that they usually comprise at lease one sensor device (door or window switch, motion detector, glass break sensor, fire sensor, or the like), a control panel or module, usually including a microprocessor, and a communications device for dialing out to an alarm monitoring station to report alarms as well as device status, activation, deactivation, and the like.

Broadband satellite interface 120 may be coupled to alarm system 110. Broadband satellite interface 120 may receive calls from alarm system 110 and direct such calls to middleware processing center 130 via a communication satellite link 170 comprising home broadband satellite dish 125, satellite 126, and broadband satellite dish 127 at middleware provider 127. Communications satellite link 170 may comprise, for example, a satellite link provided by HughesNet (formerly DirectWay) of Germantown, Md., offering home and business Internet service via satellite link.

Satellite interface 120 may comprise a network router or the like coupled to a satellite modem (e.g., HN9000S or the like). Satellite interface may specifically comprise a VoIP network router, such used with Vontage® services and the like, such as the Linksys® Broadband Router RT31P2 manufactured by Linksys division of Cisco Corporation of Irvine, Calif. Dish 125 may comprise an approximately two-way 1-meter dish with an approximately 1-watt uplink low noise amplifier (LNA), and satellite modem HN9000s as presently used by the HughesNet of Germantown Md. Other types of dishes, amplifiers, and also networks may be used within the spirit and scope of the present invention. Satellite 126 may comprise a geo-synchronous and geo-stable satellite orbiting approximately 22,233 miles above the earth's surface. Satellite dish 127 may comprise a two-way communications dish similar to dish 125 or a larger dish as used by a network provider or the like.

Note that in the preferred embodiment, a middleware provider 130 is illustrated in FIG. 1. However, in other embodiments, broadband satellite dish 127 may be connected directly to an alarm monitoring company 140, or may be used for other communications network types. In addition to broadband satellite dish 127, middleware processing center 130 may comprise a number of modems, alarm signal receivers, or the like for receiving incoming telephone calls and broadband signals, along with a computer or computers networked together, for processing incoming calls. Middleware processing center 120 may identify the source of an incoming call based upon the customer's caller-ID number or other indicia (Internet ID, alarm system ID, or the like). Alarm data is then translated into a format acceptable to alarm monitoring company 140, including a customer account or identification number correlated from the customer's caller-ID number, and transmitted to alarm monitoring company 140.

Note that for the purposes of this application, "alarm data" include not only signals indicating an alarm, but also information which may be sent by an alarm system, including but not limited to activation and deactivation events, regular system status checks, system status alarms (low battery, tamper) and the like.

To alarm monitoring company 140, it appears only that a typical alarm signal has been received. Alarm monitoring company 140 does not have any indication whether the alarm signal was transmitted by telephone, Internet, Internet VoIP, satellite link 170, or other means. Alarm monitoring company 140 may then process the signal according to its own internal policies (e.g., dispatching fire or police services, calling the customer, or the like).

In this manner, a customer at home 100 may be able to use a satellite-based Internet provider as a communications link for alarm system processing. However, as noted in the Background of the Invention, Prior Art alarm systems are not compatible with satellite link 170. In particular, the long transit time from Earth to the satellite and back can delay various signals, causing important handshake signals to be missed. Moreover, the communications link may not be as robust as a POTS call, VoIP link or other Internet link.

Middleware provider 130 may also offer ancillary alarm services and products. For example, as illustrated in FIG. 1, a signal may be sent to a customer pager, cell phone, e-mail, land-line or the like 150 indicating that an alarm event has occurred. Middleware processing center 130 may be programmed to retransmit only those alarm signals of interest to a customer (fire, burglary, or the like) rather than all signals including status checks.

Since the signal from satellite dish 125 has to transmit 22,233 miles to satellite 126 and then back 22,233 miles to satellite dish 127, the total distance traveled is 44,466 miles. Dividing this sum by the speed of light (670,616,630.6 miles per hour) yields a delay of 238.72 milliseconds, not including transponder delays and the like. While this quarter second delay might not seem like much, to a computer system it may be an eternity. The handshake of such prior art protocols as the Contact ID illustrated in FIG. 2 may not function properly, as the system will time out before handshake and acknowledge signals are received.

Figure 2:
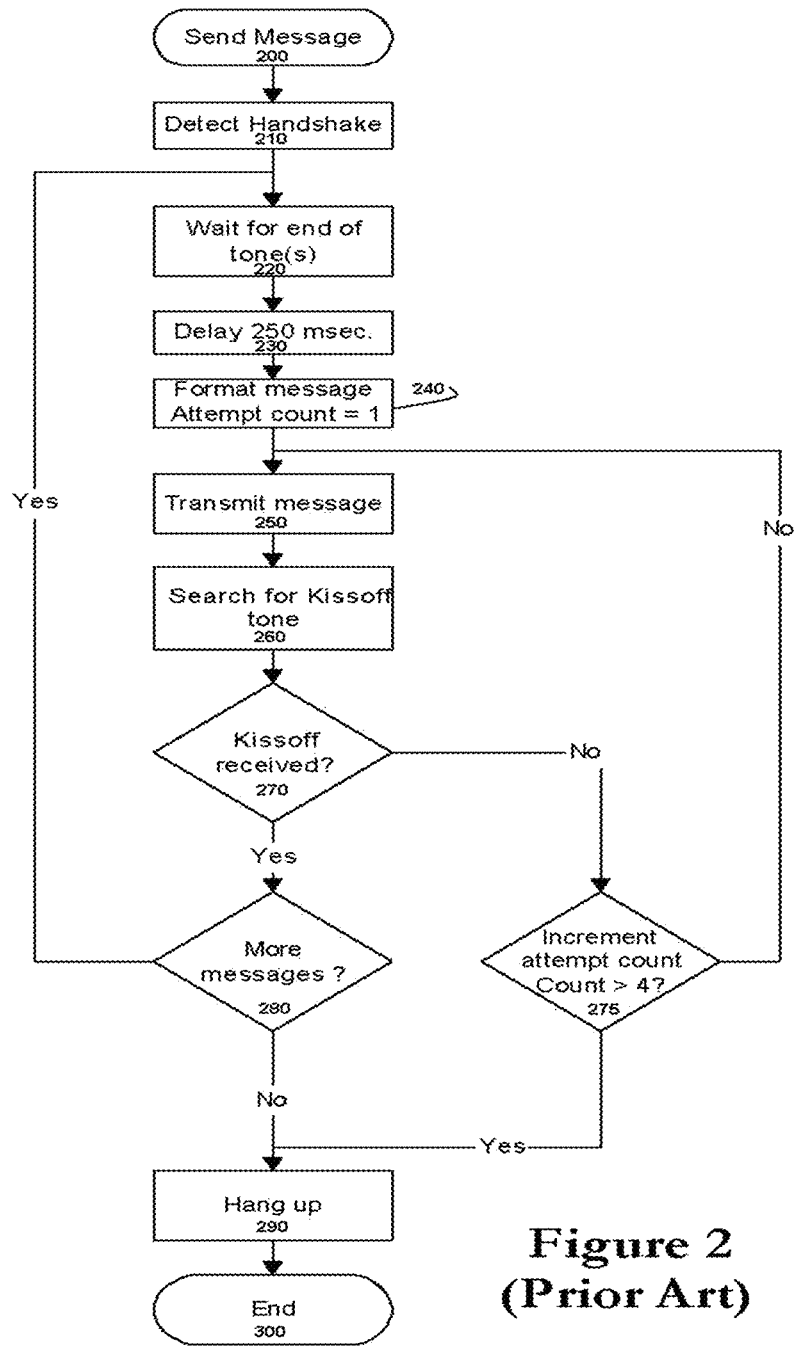
FIG. 2 is a flow chart illustrating the steps of the Contact ID protocol of the Prior Art.
Figure 3:
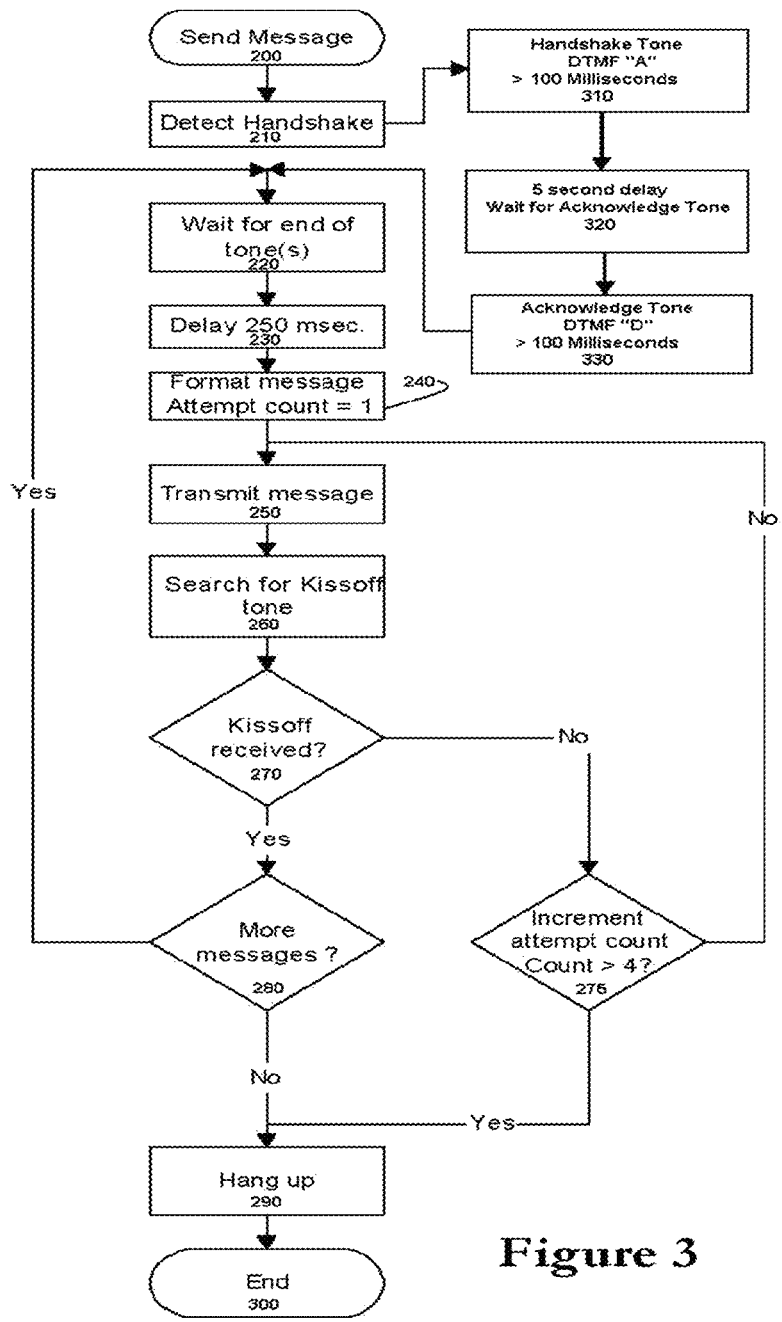
FIG. 3 is a flow chart illustrating the steps of one particular embodiment of the satellite alarm protocol of the present invention.

Referring to FIG. 3, one specific embodiment of the present invention allows an alarm monitoring to use satellite broadband services as a data link for communication between an alarms system and a monitoring station, middleware provider, individual user, or other alarm monitor. Process steps in the protocol that are similar to that of Prior Art FIG. 2 are given common reference numerals and are not elaborated here.

Referring to FIG. 3, the standard alarm system protocols are modified to make the communication protocol compatible with the features of satellite broadband. These modifications compensate for the time delay in data transmission inherent in satellite communications. In particular step 210 is illustrated as comprising new sub-steps 310, 320, 330. In step 310, the "handshake" tone, instead of "1400 hz for 100 ms, silence for 100 ms, 2300 hz for 100 ms" in the Prior Art, is changed to "DTMF 'A' for at least 100 milliseconds". In a preferred embodiment the receiver transmits the DTMF A tone for 250 milliseconds, to compensate for the delay introduced by the satellite link. In step 320, the delay for "wait for the Acknowledge tone" is extended from 1.25 seconds, to 5 seconds. In step 330, the "acknowledge" tone, instead of "1400 hz for 400 ms", is changed to "DTMF 'D' for at least 100 milliseconds". In a preferred embodiment, the receiver transmits the DTMF D tone for 250 milliseconds, again to compensate for the delay due to the satellite link.

The embodiment of FIG. 3 illustrates how the handshake process may be modified to compensate for the time delay and other factors introduced by using a satellite connection for alarm monitoring. However, with the proliferation of network choices for communication (satellite, cable modem, DSL, modem, cellular modem, WiFi, broadband cellular, and future communications networks) it is possible that the solution of FIG. 3, while optimal for satellite communications, may not be operable with other communications networks. In addition, adding the time delays used in the embodiment of FIG. 3 to an alarm device may make the device inoperable when switched to more conventional networks. In another embodiment of the present invention, a technique is employed to determined the network used, and employ handshake protocols appropriate for that network.

Figure 4:
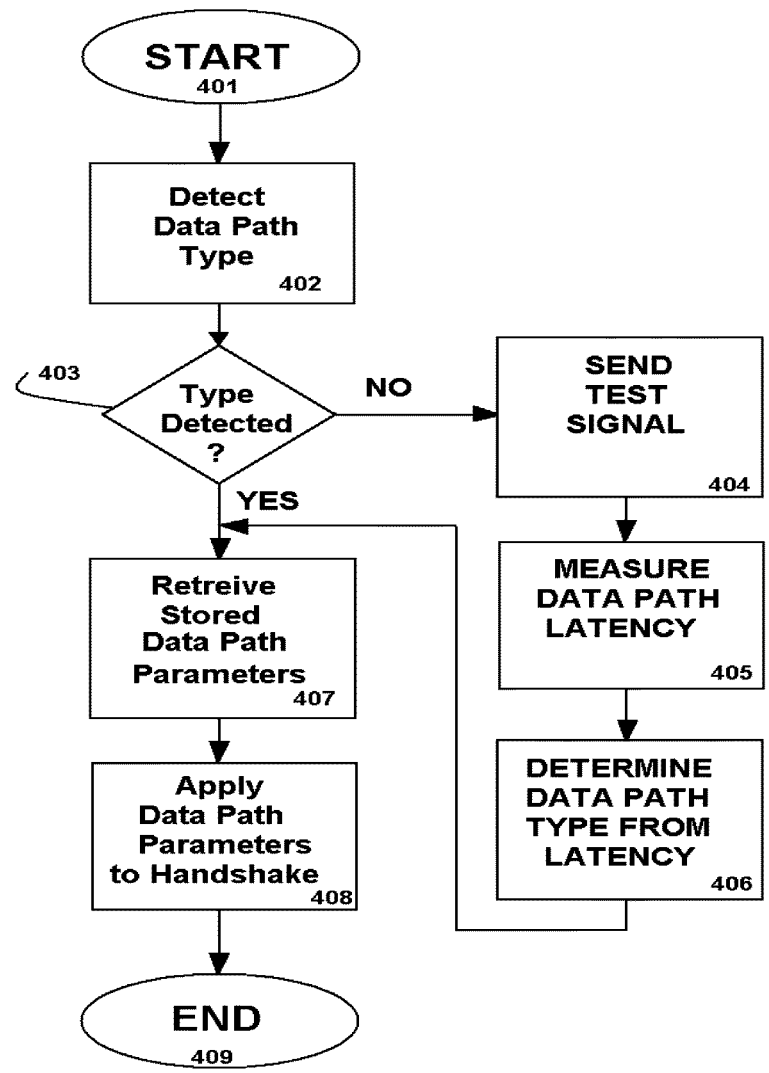
FIG. 4 is a block diagram illustrating the steps in detecting the data path and implementing data path parameters into the handshake protocol in the present invention.

FIG. 4 is a block diagram illustrating the steps in detecting the data path and implementing data path parameters into the handshake protocol in the present invention. Detection of the data path may take place within the home 100 in interface 120 or alarm system 110. A similar process may be used in the middleware processing center 130 or alarm monitoring company 140. Referring to FIG. 4, the process starts in step 401. In step 402, the data path type is detected. In this instance data path may represent a selection of one of satellite, POTS modem, cellular modem, DSL, cable modem, or other data network. This detection may take the form of a programming into a PROM, EEPROM, a selector switch, or other memory or device, the type of data path the alarm device or interface is intended for. Thus, for example, a user may program the device to select which data path is to be employed, using a setup routine, control switch, or the like. Alternately, the device may be programmed at the factory or by a technician to select a particular data path type.

In step 403, a determination is made as to whether a data path type has been detected or indicated. If no data path type is programmed into the device or otherwise detected, the system may be provided with means for detecting data path type, as will be explained below. Otherwise, in step 407, stored data path parameters may be retrieved from memory. These data path parameters may include handshake protocols, delay times, and other parameters necessary to modify the handshake and/or communications protocols within the device in order to reliably function with a given data path. In step 408, these data path parameters are applied to the handshake protocol and processing ends in step 409. Note that once the data path parameters are loaded, it may not be necessary to re-load these parameters, unless the device is reset, or power lost, or a new data path is connected to the device.

If no data path is selected or the device is unable to communicate because the wrong data path is selected, processing may pass to step 404, where a test signal may be sent over the data path. This test signal may be received at a receiving station and then re-send back to the apparatus. In step 405, the data path latency period may be measured from this signal. A plurality of such signals may be sent to measure changes in the latency period. In step 406, the data path may be determined from the latency period. Thus, for example, if a delay of more than 250 milliseconds is detected, it may be determined that the data path is a satellite data path, and corresponding handshake parameters selected as previously noted. In this manner, the apparatus may be dynamically programmed to alter its handshake protocol in response to changes in data path. Thus, for example, if a user moves the alarm apparatus to a different location using a different data path, the apparatus may compensate for the different data path in a seamless and transparent manner.

Alternately, latency alone may be used to determine handshake protocol, without making a determination of signal path type. Handshake protocol may be determined by latency of the communications channel, and a corresponding handshake selected based on the determined latency period. In addition, the present invention may encompass more than channel latency. For example, the apparatus may ping a remote device for channel characterization, and the remote device may reply with well-characterized tone (frequency, duration and strength). The device that is characterizing the channel may look not only at latency times, but could also look at distortions in the tone (change in frequency, change in duration, change in strength, level of noise, and the like) and establish communication parameters that compensate for any anomalies induced by the communication channel.

Once the communications channel has been selected or determined, the communications protocols for that channel, which may include all or a portion of the handshake protocols, may be modified accordingly in accordance with predetermined (stored) parameters in order to more effectively communicate over the communications channel.

While the preferred embodiment and various alternative embodiments of the invention have been disclosed and described in detail herein, it may be apparent to those skilled in the art that various changes in form and detail may be made therein without departing from the spirit and scope thereof.

We claim:

1. A system, comprising:
    an alarm system operative to:
        detect data path characteristics;
        retrieve stored data path parameters corresponding to the detected data path characteristics;
        compensate for a data path latency by applying the stored data path parameters corresponding to the detected data path characteristics to at least a portion of communications protocols of the alarm system;
        generate a handshake tone over a satellite communication link comprising a Dual Tone Multiple Frequency 'A' tone for at least 100 milliseconds; and wait for an acknowledge tone for 5 seconds based on the data path latency; and
    a monitoring center operative to generate the acknowledge tone comprising a Dual Tone Multiple Frequency 'D' for at least 100 milliseconds.

2. The system of claim 1, wherein the handshake tone comprises the Dual Tone Multiple Frequency 'A' tone for 250 milliseconds.

3. The system of claim 1, wherein the acknowledge tone comprises the Dual Tone Multiple Frequency 'D' for 250 milliseconds.

4. The system of claim 1, wherein sending and receiving the test signal comprises transmitting the test signal over the satellite communication link.

5. The system of claim 1, wherein the alarm system is operative to retrieve from memory an indication of the data path characteristics.

6. The system of claim 1, wherein the alarm system is operative to detect a signal from a data path characteristics selection switch.

7. The system of claim 1, wherein the alarm system is operative to:
    measure the data path latency by measuring time between when the test signal is sent and received; and
    determine the data path characteristics from the data path latency.

8. A satellite compatible alarm system capable of communicating via a satellite communication link, comprising:
    means for detecting data path characteristics;
    means for retrieving stored data path parameters corresponding to the detected data path characteristics;
    means for determining a data path latency associated with the satellite communication link;
    means for compensating for the data path latency by applying the stored data path parameters corresponding to the detected data path characteristics to at least a portion of communications protocols of the alarm system;
    means for generating a handshake tone over the satellite communication link comprising a Dual Tone Multiple Frequency 'A' tone for at least 100 milliseconds in accordance with the data path latency;
    means for waiting for an acknowledge tone for 5 seconds in accordance with the data path latency; and
    means for detecting the acknowledge tone comprising a Dual Tone Multiple Frequency 'D' for at least 100 milliseconds in accordance with the data path latency.

9. The alarm system of claim 8, wherein the handshake tone comprises the Dual Tone Multiple Frequency 'A' tone for 250 milliseconds.

10. The alarm system of claim 8, wherein the acknowledge tone comprises the Dual Tone Multiple Frequency 'D' for 250 milliseconds.

11. The alarm system of claim 8, wherein detecting the data path characteristics comprises detecting a signal from a data characteristics selection switch.

12. The alarm system of claim 8, wherein detecting the data path characteristics comprises retrieving from memory an indication of the data path characteristics.

13. The alarm system of claim 8, wherein detecting the data path characteristics comprises the steps of:
    sending a test signal over a data path;
    receiving the sent test signal from the data path;
    measuring the data path latency by measuring time between when the test signal is sent and received; and
    determining the data path characteristics from the data path latency.

14. The alarm system of claim 8, further comprising:
    means for generating a handshake tone comprising a tone of 1400 hz for 100 ms, silence for 100 ms, and then a tone of 2300 hz for 100 ms;
    means for waiting for an acknowledge tone for a period of 1.25 seconds; and
    means for receiving an acknowledge tone comprising a 1400 hz tone generated for 400 ms.

15. A method for communicating between an alarm system and a monitoring center via a satellite communication link, the method comprising the steps of:
    detecting communication path characteristics, wherein detecting the communication path characteristics comprises:
        sending a test signal over a communication path that comprises the satellite communication link;
        receiving the test signal sent over the communication path; and
        determining latency for the communication path based on timing between the sending step and the receiving step;

retrieving stored communication path parameters corresponding to the detected communication path characteristics; and compensating for the determined communication path latency by modifying at least one alarm system protocol based on the determined latency, wherein the at least one alarm system protocol is modified by applying the stored communication path parameters to at least a portion of communication protocols of the alarm system protocol, and wherein applying the stored communication path parameters to at least the portion of the communication protocols comprises:

generating a handshake tone comprising a Dual Tone Multiple Frequency 'A' tone for at least 100 milliseconds in accordance with the modified at least one alarm system protocol;

waiting for an acknowledge tone for 5 seconds in accordance with the modified at least one alarm system protocol; and receiving the acknowledge tone comprising a Dual Tone Multiple Frequency 'D' for at least 100 milliseconds in accordance with the modified at least one alarm system protocol.

16. The method of claim 15, wherein the step of generating the handshake tone comprising the Dual Tone Multiple Frequency 'A' tone for at least 100 milliseconds comprises the step of generating the Dual Tone Multiple Frequency 'A' tone for 250 milliseconds.

17. The method of claim 15, wherein the step of receiving the acknowledge tone comprising the Dual Tone Multiple Frequency 'D' for at least 100 milliseconds comprises the step of receiving the acknowledge tone comprising the Dual Tone Multiple Frequency 'D' for 250 milliseconds.

18. A method, for selecting a handshake protocol for an alarm system, comprising the steps of:

by the alarm system, detecting data path characteristics, wherein detecting the data path characteristics comprises:

by the alarm system, sending a test signal on a data path that extends from the alarm system to a station that receives the test signal and resends the test signal back to the alarm system, wherein the station is remote from the alarm system;

by the alarm system, receiving the test signal from the data path after the station receives and resends the test signal;

by the alarm system, determining latency of the data path based on delay between the sending of the test signal by the alarm system and the receiving of the test signal by the alarm system;

by the alarm system, determining whether the data path comprises a satellite data path based on comparing the determined latency to a threshold;

by the alarm system, retrieving stored data path parameters corresponding to the detected communication path characteristics;

if the data path is determined to comprise the satellite data path, then, by the alarm system, selecting a handshake protocol for the satellite data path or else selecting a different handshake protocol; and by the alarm system, compensating for the latency of the satellite data path by applying the stored data path parameters corresponding to the data path characteristics of the satellite data path to at least a portion of the selected handshake protocol.

19. The method of claim 18, wherein the station comprises a middleware processing center.

20. The method of claim 18, wherein the selected handshake protocol establishes a communication parameter that compensates for signal frequency distortion based on signal frequency distortion of the test signal by the data path.

21. The method of claim 18, wherein the step of applying the data path parameters to the selected handshake protocol for the satellite data path comprises:

generating a handshake tone comprising a first Dual Tone Multiple Frequency tone for at least 100 milliseconds;

waiting for an acknowledge tone for 5 seconds; and receiving the acknowledge tone comprising a second Dual Tone Multiple Frequency for at least 100 milliseconds.

22. The method of claim 21, wherein the step of generating the handshake tone comprising the first Dual Tone Multiple Frequency tone for at least 100 milliseconds comprises the step of generating a Dual Tone Multiple Frequency 'A' tone for at least 100 milliseconds.

23. The method of claim 21, wherein the step of receiving the acknowledge tone comprising the second Dual Tone Multiple Frequency for at least 100 milliseconds comprises the step of receiving a Dual Tone Multiple Frequency 'D' tone for at least 100 milliseconds.

24. The method of claim 22, wherein the step of generating the handshake tone comprising the Dual Tone Multiple Frequency 'A' tone for at least 100 milliseconds comprises the step of generating the Dual Tone Multiple Frequency 'A' tone for 250 milliseconds.

* * * * *